March 2, 1943. P. ORR Re. 22,281

TRANSMISSION SYNCHRONIZER

Original Filed Nov. 8, 1939 2 Sheets-Sheet 1

INVENTOR.
Palmer Orr
BY Edward C. Gritzbaugh
ATTORNEY.

March 2, 1943. P. ORR Re. 22,281
TRANSMISSION SYNCHRONIZER
Original Filed Nov. 8, 1939 2 Sheets-Sheet 2
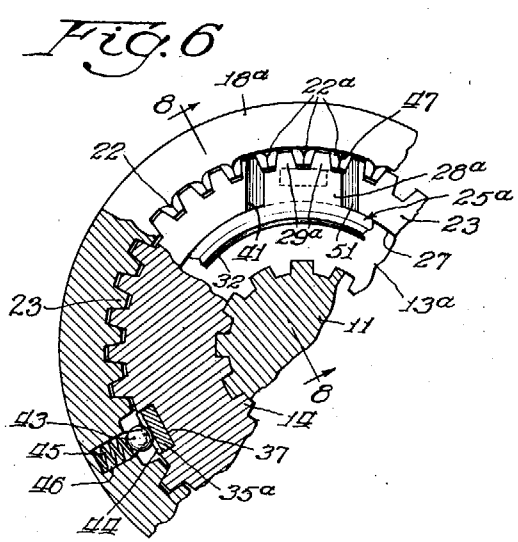
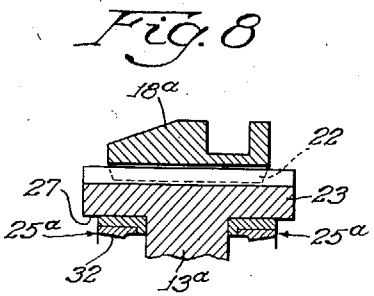
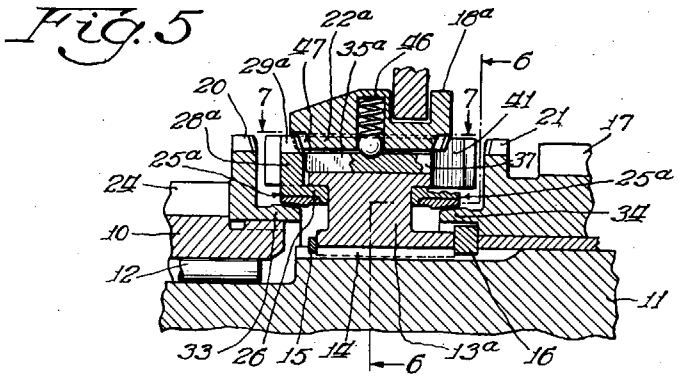
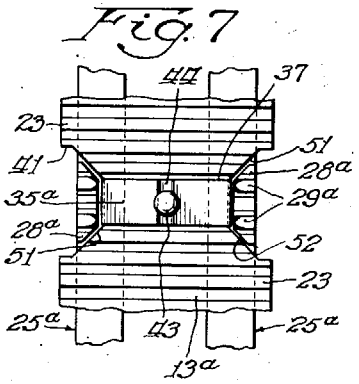
Inventor:
Palmer Orr
By: Edward C. Gritzbaugh
Atty.

Reissued Mar. 2, 1943

Re. 22,281

UNITED STATES PATENT OFFICE 22,281

TRANSMISSION SYNCHRONIZER

Palmer Orr, Muncie, Ind., assignor to Borg-Warner Corporation, Chicago, Ill., a corporation of Illinois Original No. 2,221,892, dated November 19, 1940, Serial No. 303,382, November 8, 1939. Application for reissue January 10, 1941, Serial No. 373,969

27 Claims. (Cl. 192—53)

This application forms a continuation-in-part of my application, Serial No. 216,861, filed July 1, 1938, for transmission synchronizers.

The invention relates to transmission synchronizers of the type wherein, preparatory to meshing a pair of positive drive elements such as gears or jaw clutch elements, the rotational speeds of such positive drive elements are synchronized by axially shifting a synchronizer ring drivingly associated with one of said positive drive elements, into frictional clutching engagement with a friction clutch element drivingly associated with the other of such positive drive elements, and has particular application to that type of synchronizing mechanism wherein axial thrust for developing synchronizing driving engagement between the synchronizer rings and their co-operating cones, is transmitted to the synchronizer ring from the movable positive drive element during the initial stage of shifting of such element into mesh with its cooperating positive drive element, wherein the driving association of the synchronizer ring with its associated member permits limited oscillatory adjustment of the ring, and wherein the ring is provided with blocker means adapted, in one position of such oscillatory adjustment, to block axial advance of the movable positive drive element until synchronization has been effected.

A general object of the invention is to provide an improved arrangement for transmitting thrust from the movable positive drive element to the synchronizer ring. An arrangement widely employed in the past has been one in which a movable jaw clutch element, in the form of an annular sleeve, is splined upon the periphery of a hub element, and is adapted to transmit axial thrust to the synchronizer ring through the medium of the hub, the latter mounted upon the shaft for axial sliding movement in order to permit such transmission of thrust. A specific object of the invention is to substantially reduce the resistance to shifting movement which is offered by the hub. To this end, the invention contemplates an arrangement wherein the hub is axially fixed on its shaft, and thrust is transmitted through the medium of a direct thrust connection between the jaw clutch sleeve and the synchronizer ring, adapted in the initial stage of shifting movement of the sleeve to move the synchronizer ring into engagement with its co-operating cone so as to shift the ring to its blocking position, and under pressure applied to the sleeve, to yield or release so as to permit additional shift of the sleeve into clutching engagement with a coacting clutch element. The shifting of the synchronizer ring to blocking position and movement of the ring axially for establishing frictional clutching engagement with its cooperating friction clutch element, are provided for by a lost mostion circumferentially oscillating and axially shiftable association between the ring and the hub.

While any type of thrust transmitting means having the characteristics pointed out above may be employed, the invention contemplates, as a specific object, to employ an efficient, inexpensive and easily assembled arrangement of axially extending bars interposed radially between the hub and the movable jaw clutch sleeve, the intermediate regions of said bars having thrust receiving engagement with the interior of the sleeve and the ends of the bars having abutting engagement with the synchronizer ring.

A more particular object of the invention, and one that is highly important is to provide an arrangement of this type which is extremely compact, particularly in an axial direction. There is a very definite restriction in the axial space available for synchronizing mechanism in transmissions for passenger automobiles. In order to attain compactness, the synchronizer rings are axially recessed into the hub so that the amount of axial space required for accommodating the synchronizer rings between the hub rim and the adjacent jaw clutch elements, is reduced to a minimum.

Other objects, the advantages and uses of the invention will become more apparent after reading the following specification and claims, and after consideration of the drawings forming a part of the specification, wherein:

Fig. 5 is an axial sectional view of a somewhat modified form of the invention;

Fig. 6 is a transverse sectional view taken on the line 6—6 of Fig. 5;

Fig. 7 is a plan view of the hub assembly taken on the line 7—7 of Fig. 5; and

Fig. 8 is an axial sectional view taken on the line 8—8 of Fig. 6.

Figure 1:
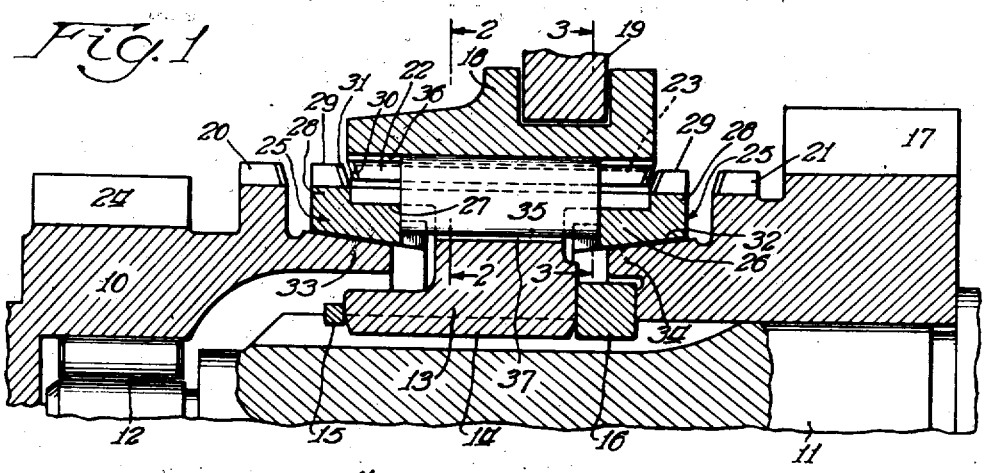
Fig. 1 is an axial sectional view of a synchronizer embodying the invention.
Figure 2:
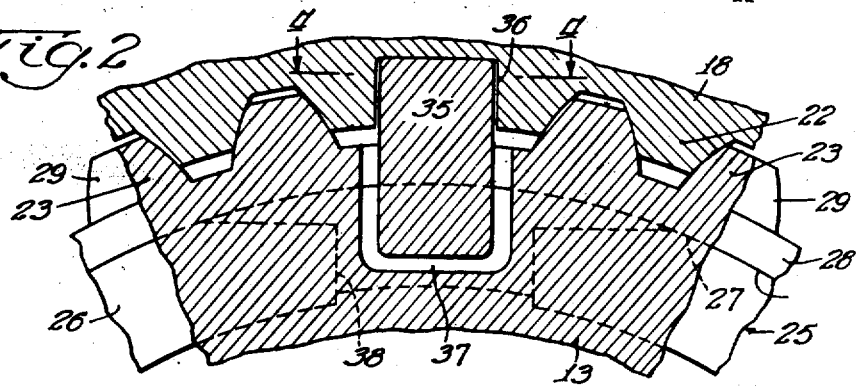
Fig. 2 is a transverse sectional view of the same taken as indicated by the line 2—2 of Fig. 1.
Figure 3:
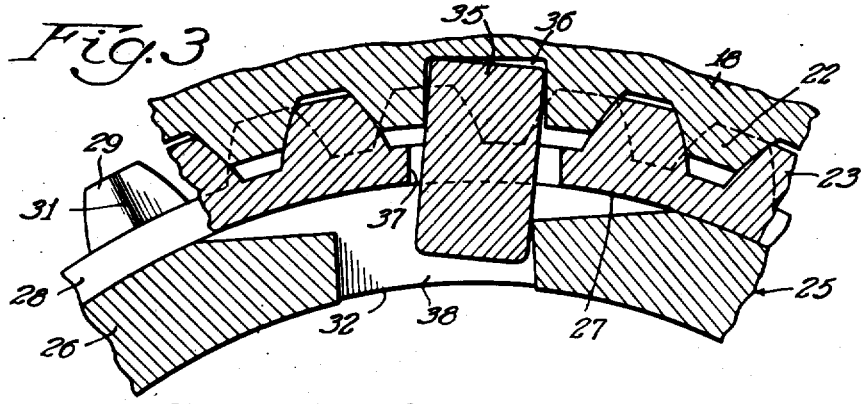
Fig. 3 is a transverse sectional view showing the parts in a different position of operation taken as indicated by the line 3—3 of Fig. 1.
Figure 4:
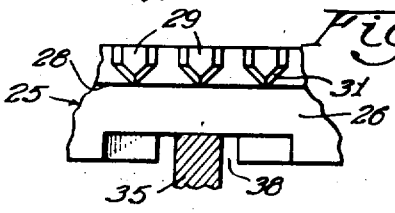
Fig. 4 is a detailed sectional view taken as indicated by the line 4—4 of Fig. 2.

The drawings show two embodiments of the invention which differ considerably in specific details of construction and operation but which both embody the construction, arrangement, and operation which characterize the invention. I have shown in Figs. 1 to 4 inclusive, a portion of a synchronizing transmission including a torque-transmitting member 10, forming the rear end of the drive shaft of the transmission, and torque-transmitting members including the driven shaft 11, piloted as at 12 in the member 10, and the hub member 13 splined as at 14 on the driven shaft 11 and secured against axial movement by retaining rings 15 and 16. Positive drive connection may be established between the torque transmitting members 10 and 11, or between a reduction geared torque transmitting member 17 and the member 11, by an axially movable positive drive element in the form of a jaw clutch sleeve 18, adapted to be shifted by a shifting fork 19 into positive clutching engagement with clutch teeth 20 formed on the torque-transmitting member 10, or clutch teeth 21 formed on the torque-transmitting member 17. The sleeve 18 is formed with internal clutch teeth 22 in sliding splined engagement with the rim 23 of the hub member 13, and adapted to engage the clutch teeth 20 or 21 when moved axially.

The torque transmitting member 17 comprises part of a reduction gear train driven from a pinion 24 on the drive shaft 10, through the medium of a conventional countershaft gear cluster. Upon being moved into clutching engagement with the clutch teeth 20, the sleeve 18 will receive rotation from the drive shaft 10 and transmit it directly through the hub 13 to the driven shaft 11. Upon being moved in the opposite direction into clutching engagement with the teeth 21, the sleeve 18 will receive rotation from the torque transmitting member 17 and through the countershaft just referred to, and will transmit it through the hub member 13 to the driven shaft 11.

In order to synchronize a torque-transmitting member 10 or 17 with the hub 13 preparatory to establishing such clutching engagement, I provide a pair of synchronizer rings 25 each including a substantially cylindrical collar portion 26 received in an axially opening annular groove 27 defined within the rim portion 23 of the hub member 13, and a radially outwardly extending flange 28 formed with blocker teeth 29 between which the teeth 22 of the movable clutch sleeve 18 must pass before the clutching engagement may be had with the clutch teeth 20 or 21. The opposed ends of the teeth 22 and 29 may be chamfered, as shown at 30 and 31 respectively. The synchronizer rings 25 are provided with internal conical clutch faces 32 adapted to engage external conical clutch faces of clutch elements 33 and 34 respectively, formed on the torque transmitting members 10 and 17.

In order to effect the initial clutching engagement between a friction clutch face 33 or 34 and its cooperating friction face 32, a ring 25 is urged axially by axial thrust transmitted to it from the movable clutch element through the medium of thrust members 35. The thrust members 35 are in the form of bars disposed in axially extending notches 37 in the peripheral region of the hub 13, and are adapted to receive axial thrust from the slidable jaw clutch sleeve 18 during an initial stage of shifting movement thereof, and to transmit such thrust directly to a synchronizer ring 25.

The form of the invention shown in Figs. 5 to 8 inclusive, has substantially the same identical parts in the same arrangement as that described above, and the same reference characters are therefore used to designate such parts, with the exception of the thrust bars 35*a*, hub 13*a*, the shiftable jaw clutch sleeve 18*a*, and the synchronizer rings 25*a* which are somewhat modified in construction. Whereas the radially outwardly extending synchronizer ring flanges of Fig. 1 are circumferentially continuous, and embrace the radial edges of the rim portion 23 of the hub, the rings 25*a* are provided with circumferentially spaced lug portions 28*a* which project outwardly through notches 41 in the hub rim. In the Fig. 1 form of the invention, such thrust is developed frictionally between a radially outer region of the bar 35 and an axial notch 36 in the sleeve 18, in which such radially outer region is received. In the form of the invention shown in Fig. 5, thrust is transmitted through a bar 35*a* by means of a poppet ball 43 urged into a notch 44 in the outer face of the bar 35*a* by means of a spring 45 seated in a socket 46 in the sleeve 18*a*.

In the Fig. 1 form of the invention, the blocker teeth 29 are substantially continuous around the entire periphery of the synchronizer ring 25, and, when the sleeve 18 is in neutral position as shown in Fig. 1, are disposed axially beyond the end of the sleeve. In the form shown in Fig. 5, the blocker teeth 29*a*, formed in the lugs 28*a*, extend into recesses 47, formed by cutting away several teeth 22*a* of the sleeve 18*a*, the remaining teeth 22 being of full length.

The blocker teeth 29, or 29*a*, as the case may be, are adapted to be positioned in blocking relation to the teeth 22 of the Fig. 1 form or 22*a* of the Fig. 5 form, by biasing of the synchronizer ring to one limit of an oscillatory lost motion connection with the hub. Such lost motion connection, is, in the Fig. 1 form, formed by the extension of an end of the bar 35 into a notch 38 in the synchronizer ring 25, and, in the Fig. 5 form, by the extension of the lugs 28*a* through the notches 41. The notches 38 and the notches 41 are of greater extent circumferentially than the bars 35 and the lug 28*a* respectively, so as to allow limited oscillation of the synchronizer rings relative to the hub.

Oscillation of a synchronizer ring to full blocking position is effected by the initial clutching engagement between the friction clutch faces. In the event that the synchronizer ring should be in the neutral position shown in Fig. 2 at the beginning of a shift, centrifugal force acting on the bars 35 will develop sufficient frictional engagement between the bars and the notches 36 to cause the bars to transmit to the synchronizer ring the slight amount of pressure required for causing the ring to assume the biased position in which it shifts the thrust bars into binding engagement with the notches 36. The invention also contemplates that the friction faces 32 and the friction faces 33 and 34 respectively may be so closely associated when the movable clutch element is in neutral position, that a film of oil may exist between these faces and develop under relative rotation thereof, a slight "oil drag" tending constantly to rotate the synchronizer ring toward the limit of its lost motion connection.

The initial rotation of the ring relative to the hub 13 under thrust from the bars 35, or by oil drag, as described, will be sufficient to rotate the bars 35 into binding engagement with the notches 36 and thus build up the axial thrust sufficiently to ensure the application of sufficient torque to the ring to prevent the ring from being forced back out of its blocking position when the chamfered faces of the teeth 22 or 22a as the case maybe, engage the cooperating chamfered faces of the teeth 29 or 29a respectively.

The thrust transmitting connection is adapted to yield under sufficient axial pressure of the sleeve so as to allow the sleeve to advance into engagement with the blocker teeth 29. The synchronizing operation, which has been started by the thrust transmitted through the thrust bars, may then be completed by thrust transmitted by direct contact of the teeth 22 or 22a against the blocker teeth 29 or 29a as the case may be. The yielding of the thrust connection, in the Fig. 1 form, comprises the slipping of the bars 35 in the notches 36. In the Fig. 5 form, it comprises the recession of the balls 43 against the pressure of the spring 45.

When synchronization is reached, the synchronizer ring will be oscillated back to a neutral position wherein the teeth of the movable jaw clutch sleeve are in register with the spaces between the blocker teeth. As the ring thus approaches the neutral position, the chamfered end faces of the sleeve and blocker teeth will slide upon each other so as to guide the sleeve teeth gradually into the spaces between the blocker teeth under the continuous urging pressure of the shifting fork 19. The shifting of the synchronizer ring back to a neutral position also has the effect, in the Fig. 1 form, of relaxing the binding engagement of the bars 35 in the slots 36, thereby relieving the resisting to shifting movement of the sleeve 18.

Completion of synchronization in the form shown in Fig. 5 may be effected by servo-ramps 51, forming the extremities of the notches 41, against which inclined faces 52 on the lugs 28a are adapted to engage when a ring is moved to biased position. The engagement of the faces 52 against the ramps 51 increases the axial pressure against the synchronizer ring.

It is contemplated that a synchronizer constructed in accordance with this form of the invention may be self-energizing from the point of initial clutching engagement. That is, as soon as the synchronizer ring makes contact with its cooperating friction cone, the resulting rotation of the ring will cause the inclined faces 52 of the lugs 28a to react against the ramps 51 so as to develop sufficient axial thrust against the ring to complete synchronization without further effort on the part of the operator. The degree of servo action depends on the angularity of the cam surfaces 51 and 52. If the angle of these surfaces is too steep, there will be relatively little servo action. On the other hand, if the angle is too low, the lugs will wedge against the ramps so as to make it unduly difficult to break the wedging connection. The breaking of the wedging connection is effected by the chamfers on the teeth 29a and 22a when the sleeve 18a passes through the blocker lugs to a positive clutching position.

The invention provides an improved arrangement of parts in a synchronizer. The hub member is axially fixed on the shaft on which it is mounted and thrust is transmitted directly from the shiftable jaw clutch sleeve to the synchronizer ring through the medium of thrust elements without the necessity of sliding the hub. The synchronizer rings are accommodated in the axially opening recesses defined within the rim of the hub, making it possible to employ a rim of ample axial dimension and yet maintain axial compactness in the assembly. The shiftable jaw clutch sleeve, which carries the drive from one shaft to another, is the outermost element of the assembly and therefore has a maximum diameter. This makes it possible to employ a maximum number of jaw clutch teeth and thereby minimize the likelihood of failure occurring in the jaw clutch element. The synchronizer rings, which are operative only a small portion of the total life of the transmission, are of smaller diameter and may be accommodated substantially entirely within the space encircled by the jaw clutch sleeve. The thrust bars are disposed radially intermediate the sleeve and the synchronizer rings and thus are positioned radially outwardly of the outline of the friction faces. They may, as shown in Fig. 5, overlap the collar portion 26 of the synchronizer ring and engage the radially outwardly extending portions 28a thereof. Thus the bars may be made long enough to ensure smooth sliding in the notches 37, and need not be unduly thick in an axial direction.

In general, the invention achieves compactness in an axial direction by telescoping the various parts within the shiftable jaw clutch sleeve and overlapping the parts axially while employing ample space in a radial direction to accommodate such overlapping. This is an advantage for the reason that the conventional transmission provides more spare space in a radial direction than in an axial direction.

I claim:

1. A transmission synchronizer comprising a pair of aligned torque transmitting members, a hub axially fixed upon one of said members, a jaw clutch sleeve encircling, drivingly connected to, and axially movable on said hub, a cooperating jaw clutch element drivingly associated with said other member and adapted to be engaged by said sleeve when the latter is moved axially, thereby to form a positive drive connection between said members, said hub having in its rim an axially extending outwardly opening recess and having an annular recess defined within the inner periphery of said rim, a synchronizer ring having a portion received within said annular recess and another portion projecting radially outwardly past said axial recess, said synchronizer ring having a lost motion driving connection with the hub, being axially movable relative to the hub into frictional driving engagement with a cooperating friction clutch element drivingly associated with the other member, and having blocking means adapted when in one of its positions permitted by said lost motion connection, to block axial advance of said movable jaw clutch element and, when in another of its positions permitted by said lost motion connection to allow said movable jaw clutch element to complete its axial advance into positive clutching position, and a rigid bar disposed in said axial recess between said sleeve and said hub, axially slidable in said recess, adapted to receive axial thrust from said sleeve, and having an end in abutting relation to the radially outwardly projecting portion of said synchronizer ring so as to transmit such thrust to the synchronizer ring.

2. In a synchronizing transmission, a pair of axially aligned torque transmitting members, a hub axially fixed upon one of said members, said hub having a rim defining an axially opening annular recess, a movable jaw clutch sleeve having internal splines meshing with external splines on said rim and shiftable axially into positive clutching engagement with a jaw clutch element drivingly associated with the other member, thus to establish a positive drive connection between said members, a synchronizer ring having a collar portion received in said annular recess, oscillatable and axially shiftable with reference to said hub, adapted under axial pressure to establish a synchronizing frictional driving engagement with a friction clutch element drivingly associated with said other member, and including radially outwardly extending blocker teeth adapted as a result of frictional engagement between said synchronizer ring and said friction clutch element to be oscillated to a position blocking axial advance of said movable jaw clutch sleeve until synchronization is substantially complete, and a thrust bar radially interposed between said sleeve and said hub, arranged to receive axial thrust from said sleeve during the initial shifting movement thereof, and having an end region disposed radially outwardly of the friction clutch surfaces and in positive thrust transmitting association with said synchronizer ring so as to transmit such thrust thereto.

3. In a transmission synchronizer, a pair of axially aligned torque transmitting members to be synchronized, a hub axially fixed upon one of said members, a jaw clutch sleeve encircling said hub, drivingly associated therewith and shiftable axially into positive clutching engagement with a jaw clutch element drivingly associated with the other member, thus to establish a positive drive connection between said members, a synchronizer ring adapted under axial pressure to establish a synchronizing frictional drive connection between said hub and a friction clutch element drivingly associated with said other member, and a thrust bar disposed between said sleeve and said hub, having a region adapted to engage and arranged radially outwardly of the friction surface of said synchronizer ring, adapted to receive axial thrust from said sleeve and to transmit thrust to said synchronizer ring.

4. In a synchronizing transmission, a pair of axially aligned torque transmitting members to be synchronized, a hub axially fixed to one of said members, a jaw clutch sleeve encircling and drivingly associated with said hub and shiftable axially into positive clutching engagement with a jaw clutch element drivingly associated with the other member, thus to establish a positive drive connection between said members, a synchronizer ring oscillatable and axially shiftable with reference to said hub, adapted under axial pressure to establish a synchronizing frictional driving engagement with a friction clutch element drivingly associated with said other member, and including blocker means adapted as a result of frictional engagement between said synchronizer element and said friction clutch element to be shifted into a position blocking axial advance of said movable jaw clutch element until synchronization is substantially complete, and thrust means interposed between said sleeve and said hub, adapted to receive axial thrust from said sleeve during initial shifting movement thereof and having a region in positive thrust transmitting association with said synchronizer ring.

5. A transmission synchronizer comprising a pair of aligned rotatable torque transmitting members, a hub axially fixed on one of said members, a jaw clutch sleeve encircling, drivingly connected to, and axially movable on said hub, a jaw clutch element drivingly associated with the other member and adapted to be engaged by said movable jaw clutch element when the latter is moved axially so as to establish a positive drive connection between said members, a synchronizer element having a lost motion driving connection with said hub, adapted to be moved axially into frictional driving engagement with a cooperating friction clutch element drivingly associated with said other member, and including blocking means adapted, when in one of its positions permitted by said lost motion connection, to block axial advance of said movable jaw clutch element and, when said synchronizer element is in another of its positions permitted by said lost motion connection, to allow said movable jaw clutch element to complete its axial advance into positive clutching position, and means including a thrust bar disposed between said hub and said sleeve, radially outwardly of the outline of the friction clutch surfaces, axially slidable in the hub, having at an end a thrust transmitting connection with said synchronizer element, and adapted to receive thrust from the interior of said sleeve and to transmit the same to said synchronizer element so as to effect the initial clutching engagement between said synchronizer element and its cooperating friction clutch element.

6. A transmission synchronizer comprising a pair of aligned rotatable torque transmitting members, an axially fixed hub secured upon one of said members, a jaw clutch element encircling, drivingly connected to, and axially movable on said hub, a cooperating jaw clutch element drivingly associated with the other member and adapted to be engaged by said movable jaw clutch element when the latter is moved axially, said hub having an axially opening annular depression, a synchronizer element partially received in said depression, having a lost motion driving connection with said hub, adapted to be moved axially relative to the hub into frictional driving engagement with a cooperating friction clutch element drivingly associated with said other member, and including blocking means, adapted, when the synchronizer element is in one of its positions permitted by said lost motion connection, to block axial advance of the movable jaw clutch element and, when the synchronizer element is in another of its positions allowed by said lost motion connection, to allow the movable jaw clutch element to complete its advance into positive clutching position, and means including a thrust bar disposed between said sleeve and the hub, axially slidable relative to the hub, and adapted to receive axial thrust from said sleeve and to transmit such thrust to said synchronizer element so as to effect initial clutching engagement between said synchronizer element and its cooperating friction clutch element.

7. In a transmission synchronizer, an axially fixed driven torque-transmitting member, a pair of driving members arranged on the opposite sides of and coaxial with said driven member, each of said driving members including a jaw clutch element and a friction clutch element, a jaw clutch sleeve encircling, drivingly connected to, and axially slidable on said driven member into positive clutching engagement with either of said jaw clutch elements, a pair of synchronizer rings each drivingly associated with and axially movable relative to said driven element into frictional driving engagement with a respective friction clutch element, a plurality of substantially rigid thrust bars disposed between said sleeve and driven member, parallel to the axis of rotation thereof, adapted to receive axial thrust from said sleeve, and having their ends arranged in axially overlapping relation to portions of said synchronizer rings and radially outwardly thereof and adapted to transmit thrust thereto.

8. In a synchronizing transmission, a torque transmitting member, a synchronizing element drivingly associated therewith and adapted under axial pressure to establish a synchronizing frictional driving connection between said member and a rotatable part to be synchronized therewith, an annular positive drive element encircling said member, drivingly connected thereto and shiftable axially for establishing a positive driving connection between said member and said part, and a thrust bar interposed radially between said positive drive element and said member, and adapted to transmit axial thrust to said synchronizer element for effecting said frictional driving engagement, said synchronizer element being arranged to have limited circumferential movement with respect to said member and being associated with said bar so as to cause the latter to develop thrust receiving engagement with the movable clutch element as a result of such circumferential movement.

9. In a synchronizing transmission, a pair of axially aligned torque transmitting members, synchronizer and positive drive element drivingly associated with one of said members and movable axially into frictional driving and positive driving engagement respectively, in the order named, with friction and positive drive element carried by the other members, and a thrust element arranged to transmit axial thrust to said synchronizer element, adapted to have limited oscillative movement around an axis parallel to that of said members, and associated with said movable positive drive element so that when oscillated it will develop binding engagement therewith so as to receive thrust therefrom.

10. In a synchronizing transmission, a torque transmitting member, a synchronizer element drivingly associated therewith and adapted under axial pressure to establish a synchronizing frictional driving connection between said member and a rotatable part to be synchronized therewith, an annular positive drive element drivingly connected to said member and shiftable axially for establishing a positive driving connection between said member and said part, and a thrust element arranged to transmit axial thrust to said synchronizer element, adapted to have limited oscillative movement around an axis parallel to the axis of said members, and associated with said positive drive element so as to develop binding axial thrust receiving engagement therewith when oscillated, said synchronizer element being arranged to apply pressure to said thrust element so as to tend to oscillate the same.

11. In a synchronizing transmission, a torque transmitting member, a synchronizer element drivingly associated therewith and adapted under axial thrust to establish a synchronizing frictional driving connection between said member and a rotatable part to be synchronized therewith, an annular positive drive element encircling said member, drivingly connected thereto and shiftable axially for establishing a positive driving connection between said member and said part, and a thrust bar radially interposed between said positive drive element and said member, extending parallel to the axis of rotation, arranged to transmit axial thrust to said synchronizer element, and associated with said positive drive element so as to develop binding, thrust receiving engagement therewith when oscillated, said synchronizer element being arranged to have limited circumferential movement relative to said member and being associated with said thrust element so that in such circumferential movement it exerts pressure against said thrust element tending to oscillate the same.

12. In a synchronizing transmission, a torque transmitting member, a synchronizer element drivingly associated therewith and adapted under axial pressure to establish a synchronizing frictional driving connection between said member and a rotatable part to be synchronized therewith, an annular positive drive element encircling said member, drivingly connected thereto and shiftable axially for establishing a positive driving connection between said member and said part, a thrust bar of non-circular cross-section radially interposed between said positive drive element and said member, extending parallel to the axis of rotation, arranged to transmit axial thrust to said synchronizer element, adapted to have limited oscillative movement around its longitudinal axis, having one side region received in a recess in the interior of said positive drive element, and adapted to develop binding, axial thrust receiving engagement in said recess when oscillated, said synchronizer element being adapted to have limited circumferential movement relative to said torque transmitting member and being associated with said bar so that during such circumferential movement it will exert pressure thereagainst tending to oscillate the same.

13. A synchronizing transmission as defined in claim 12, wherein said synchronizer element is provided with means for blocking axial advance of said positive drive element when biased at one limit of said circumferential movement.

14. A synchronizing transmission as defined in claim 12, wherein said thrust bar is of flattened cross-section having substantially parallel side faces adapted to coact with side faces of said recess in the developing of said binding engagement therein.

15. A synchronizing transmission as defined in claim 12, wherein said thrust bar is of rectangular cross-section, having substantially parallel side faces, and wherein said recess is slightly wider than the thickness of said bar between said faces, and is adapted to coact with said side faces in developing said binding engagement.

16. In a synchronizing transmission, a torque transmitting member, a synchronizer element drivingly associated therewith and adapted under axial pressure to establish a synchronizing frictional driving connection between said member and a rotatable part to be synchronized therewith, an annular positive drive element encircling said member, drivingly connected thereto and shiftable axially for establishing a positive driving connection between said member and said part, and a flat thrust bar interposed between said positive drive element and said member, with its major axis parallel to the axis of said members and its minor axis substantially radial and with an end region in axial thrust transmitting association with said synchronizer element, said positive drive element having an interior axially extending recess loosely receiving the radially outer region of said bar, and said synchronizer element having a notch loosely receiving a radially inner region of an end of said bar so as to permit limited circumferential movement of said synchronizer element relative to said member, said synchronizer element being adapted, in approaching one limit of such circumferential movement to exert pressure against said thrust bar tending to oscillate the same and thereby developing binding engagement of said bar in said recess for receiving thrust from said positive drive element.

17. In a synchronizing transmission, a pair of axially aligned torque transmitting members, a movable jaw clutch sleeve surrounding and drivingly associated with one of said members and adapted to be moved axially into positive clutching engagement with a clutch element carried by the other member, a synchronizer ring drivingly associated with said one member and adapted under axial pressure to establish a synchronizing frictional driving engagement with a coacting friction clutch element drivingly associated with the other member, and a thrust transmitting bar adapted to transmit thrust to said synchronizer ring, said bar being of flat cross-section disposed within said movable clutch sleeve, its major axis parallel to the axis of said members and its minor axis substantially radial, said sleeve having an interior axially extending recess loosely receiving a radially outer side region of said bar so as to allow limited oscillating movement thereof and as a result of such oscillating movement to develop binding engagement with said bar so as to transmit axial thrust thereto, said synchronizer ring having an axially opening notch receiving a radially inner extremity of an end of said bar and of such width as to permit limited circumferential movement of said ring, said ring being adapted, when relative rotation exists between said ring and its coacting friction clutch elements, to exert pressure against said bar tending to oscillate the same so as to develop said binding engagement.

18. A synchronizing transmission as defined in claim 17, wherein said synchronizer ring is arranged to have a light driving engagement with its cooperating friction clutch element when the movable clutch element is in a neutral position.

19. In a synchronizing transmission, a pair of axially aligned torque transmitting members, a hub axially fixed to one of said members, said hub having a rim defining an axially opening annular recess, a jaw clutch sleeve encircling said rim, drivingly associated therewith and shiftable axially into positive clutching engagement with a jaw clutch element drivingly associated with the other member, thus to establish a positive drive connection between said members, a synchronizer ring having a collar portion received in said annular recess, oscillatable and axially shiftable with reference to said hub, adapted under axial pressure to establish a synchronizing frictional driving engagement with a friction clutch element drivingly associated with said other member, and including blocker means adapted as a result of frictional engagement between said synchronizer ring and said friction clutch element to be shifted to a position blocking axial advance of said movable jaw clutch sleeve until synchronization is substantially complete, and a thrust bar disposed in an axially extending recess in said rim, arranged to receive axial thrust from said sleeve, and having an end in positive thrust transmitting association with said synchronizer ring, said synchronizer ring being formed with a lug projecting radially outwardly through a radial notch in said rim, adapted to coact with the rim at the extremities of said notch to limit the oscillative movement of said ring, and provided at its radially outer extremity with the aforementioned blocker means.

20. In a synchronizing transmission, a pair of axially aligned torque transmitting members, a hub axially fixed to one of said members, said hub having a rim defining an axially opening annular recess, a jaw clutch sleeve encircling said rim, drivingly associated therewith and shiftable axially into positive clutching engagement with a jaw clutch element drivingly associated with the other member, thus to establish a positive drive connection between said members, a synchronizer ring having a collar portion received in said annular recess, oscillatable and axially shiftable with reference to said hub, adapted under axial pressure to establish a synchronizing frictional driving engagement with a friction clutch element drivingly associated with said other member, and including blocker means adapted as a result of frictional engagement between said synchronizer ring and said friction clutch element to be shifted to a position blocking axial advance of said movable jaw clutch sleeve until synchronization is substantially complete, and a thrust bar disposed in an axially extending recess in said rim, arranged to receive axial thrust from said sleeve, and having an end in positive thrust transmitting association with said synchronizer ring, said rim being provided with a radially extending notch and said synchronizer ring including a lug extending radially outwardly through said notch and formed with teeth constituting said blocker means, and wherein said sleeve is formed with internal splines in splined engagement with said rim and adapted to be engaged by said blocker teeth.

21. In a synchronizing mechanism for motor vehicle transmissions, coaxial driving members each carrying a set of clutch teeth and a friction clutch element, means drivingly connecting said members together for rotation at different speeds, a driven member adapted to selectively receive a drive from said driving members, a hub structure, means mounting said hub structure on said driven member for rotation therewith but preventing movement of said hub structure axially of said driven member, a shift device driven with said hub structure and having clutch teeth adapted to selectively clutch with said sets of clutch teeth, a synchronizing control structure disposed between each of said driving members and said hub structure, each of said control structures having a friction clutch part engageable with one of said friction clutch elements and a stop for controlling shift of said shift device, means drivingly connecting said control structures with said hub structure for accommodating axial and rotative movements of said control structures relative to said hub structure, and means releasably connecting said shift device with said control structures for selective shift of said control structures by said shift device to effect selective engagement of said friction clutch parts respectively with said friction clutch elements, said releasable connecting means accommodating additional shift of said shift device relative to said control devices for effecting selective clutching of the clutch teeth of the shift device with said sets of clutch teeth.

22. A synchronizing mechanism for motor vehicle transmissions according to claim 21, wherein the releasable connecting means comprises an element releasably engaging said shift device and adapted for selective axial displacement in transmitting shifting movement from said shift device selectively to said control structures.

23. A synchronizing mechanism for motor vehicle transmissions according to claim 21 wherein the releasable connecting means comprises an element releasably engaging the interior of said shift device for shift therewith in transmitting shifting movement from said shift device selectively to said control structures.

24. In a transmission synchronizer, a pair of coaxial torque transmitting members to be synchronized, a hub axially fixed upon one of said members, a jaw clutch sleeve encircling said hub, drivingly associated therewith and shiftable axially into positive clutching engagement with a jaw clutch element drivingly associated with the other member, thus to establish a positive drive connection between said members, a synchronizer ring adapted under axial pressure to establish a synchronizing frictional drive connection between said hub and a friction clutch element drivingly associated with said other member, and a thrust element disposed between said sleeve and said hub, radially outwardly of the friction surface of said synchronizer ring, adapted to receive axial thrust from said sleeve and arranged to transmit such thrust directly to said synchronizer ring.

25. In a synchronizing transmission, a pair of coaxial torque transmitting members to be synchronized, a hub axially fixed to one of said members, a jaw clutch sleeve encircling and drivingly associated with said hub and shiftable axially into positive clutching engagement with a jaw clutch element drivingly associated with the other member, thus to establish a positive drive connection between said members, a synchronizer ring oscillatable and axially shiftable with reference to said hub, adapted under axial pressure to establish a synchronizing frictional driving engagement with a friction clutch element drivingly associated with said other member, and including blocker means adapted as a result of frictional engagement between said synchronizer element and said friction clutch element to be shifted into a position blocking axial advance of said movable jaw clutch element until synchronization is substantially complete, and thrust means interposed between said sleeve and said hub, adapted to receive axial thrust from said sleeve during initial shifting movement thereof and having a region in positive thrust transmitting association with said synchronizer ring.

26. In a transmission synchronizer, a driven shaft, a driving member and hub having alignable peripheral clutch teeth, means detachably mounting said hub on said shaft for rotation therewith in a position adjacent said driving member and fixed against axial movement, a jaw clutch sleeve carried by said hub, having internal teeth intermeshing with the hub teeth and shiftable axially thereon, a synchronizer ring confined between said hub and said driving member, having a friction clutch part for engagement with said friction clutch element, having peripheral blocker teeth, alignable with said hub teeth, and having a driving connection with said hub permitting axial shift of said synchronizer ring into frictional driving engagement with said friction clutch element and permitting rotatable shift of said synchronizer ring relative to said hub between a position wherein said blocker teeth are in blocking relation to the teeth of said sleeve and a position permitting said sleeve to advance to a position wherein its teeth establish clutching engagement with the clutch teeth of said driving member, and means releasably connecting said sleeve with said synchronizer ring for transmitting shifting movement from the sleeve to said ring in order to move the latter into engagement with said friction clutch element, said releasable connecting means accommodating said advance of said sleeve to said clutching position.

27. A transmission synchronizer including a driven shaft having a shoulder, a driving member and a hub provided with alignable peripheral clutch teeth, each mounted on the shaft with the driving member rotatable on the shaft and confined between the hub and the shoulder and the hub drivingly connected to the shaft and detachable to permit assembly and removal of the driving member, a jaw clutch sleeve carried by the hub, having internal teeth meshing with the hub teeth and shiftable axially thereon, means fixing the hub against axial movement on the shaft, a synchronizer ring confined between said hub and said driving member, having a friction clutch part for engagement with said friction clutch element, having peripheral blocker teeth, alignable with said hub teeth, and having a driving connection with said hub permitting axial shift of said synchronizer ring into frictional driving engagement with said friction clutch element and permitting rotatable shift of said synchronizer ring relative to said hub between a position wherein said blocker teeth are in blocking relation to the teeth of said sleeve and a position permitting said sleeve to advance to a position wherein its teeth establish clutching engagement with the clutch teeth of said driving member, and means releasably connecting said sleeve with said synchronizer ring for transmitting shifting movement from the sleeve to said ring in order to move the latter into engagement with said friction clutch element, said releasable connecting means accommodating said advance of said sleeve to said clutching position.

PALMER ORR.